United States Patent
Valjakka (10) Patent No.: US 8,495,167 B2
(45) Date of Patent: Jul. 23, 2013

(54) DATA COMMUNICATIONS NETWORKS, SYSTEMS, METHODS AND APPARATUS

(76) Inventor: Lauri Valjakka, Espoo (FI)

( * ) Notice: Subject to any disclaimer, the term of this patent is extended or adjusted under 35 U.S.C. 154(b) by 252 days.

(21) Appl. No.: 10/208,685

(22) Filed: Jul. 30, 2002

(65) Prior Publication Data

US 2003/0093491 A1 May 15, 2003

(30) Foreign Application Priority Data

Aug. 2, 2001 (EP) .................................... 01660145

(51) Int. Cl.
*G06F 15/167* (2006.01)

(52) U.S. Cl.
USPC ............ 709/214; 709/212; 709/213; 709/216

(58) Field of Classification Search
USPC ................. 709/216, 218, 213, 214, 215, 217, 709/224
See application file for complete search history.

(56) References Cited

U.S. PATENT DOCUMENTS

| | | | |
|---|---|---|---|
| 5,905,952 A | 5/1999 | Joensuu et al. | |
| 6,038,296 A * | 3/2000 | Brunson et al. | 379/100.11 |
| 6,157,965 A * | 12/2000 | Mohammed et al. | 710/8 |
| 6,226,673 B1 * | 5/2001 | Yoshimoto | 709/223 |
| 6,249,810 B1 * | 6/2001 | Kiraly | 709/217 |
| 6,587,756 B2 * | 7/2003 | Moriguchi et al. | 701/1 |
| 6,873,627 B1 * | 3/2005 | Miller et al. | 370/466 |
| 6,879,982 B2 * | 4/2005 | Shirasaka | 1/1 |
| 6,912,514 B2 * | 6/2005 | Matsushima et al. | 705/52 |
| 6,950,431 B1 * | 9/2005 | Nozaki et al. | 370/390 |
| 6,970,939 B2 * | 11/2005 | Sim | 709/236 |
| 7,139,827 B1 * | 11/2006 | Iwayama et al. | 709/227 |
| 7,222,186 B2 * | 5/2007 | Kobayashi | 709/235 |
| 7,228,416 B2 * | 6/2007 | Nishizawa et al. | 713/168 |
| 7,373,103 B2 * | 5/2008 | Sato et al. | 455/7 |
| 2001/0011301 A1 * | 8/2001 | Sato et al. | 709/219 |
| 2002/0010785 A1 * | 1/2002 | Katsukawa et al. | 709/229 |

(Continued)

FOREIGN PATENT DOCUMENTS

| | | |
|---|---|---|
| EP | 0709994 | 5/1996 |
| EP | 0726663 | 8/1996 |

(Continued)

OTHER PUBLICATIONS

"System and Method for communication" by Kiraly et al. International Publication # WO 00/65776.*

(Continued)

*Primary Examiner* — Dhairya A Patel
(74) *Attorney, Agent, or Firm* — Seppo Laine Oy; Joshua P. Wert (57) ABSTRACT

A data communications network comprises a plurality of terminals and a main server adapted to manage selective retrieval of data from a first server by at least one target terminal. Some or all of the terminals are adapted to act as relay servers for serving data retrieved from the first server to at least one target terminal. The network includes a network information database and the main server selects at least one target terminal to act as a relay server for serving data to other target terminals on the basis of terminal performance information stored in the network information database. Terminals acting as relay servers also select further downstream target terminals to act as further relay servers on the basis of the relative performances of the further target terminals. The load on the main server is thus distributed among all of the relay servers, providing improved network performance.

21 Claims, 4 Drawing Sheets

U.S. PATENT DOCUMENTS

| | | | |
|---|---|---|---|
| 2002/0143977 A1* | 10/2002 | Togashi | 709/231 |
| 2003/0009539 A1* | 1/2003 | Hattori | 709/219 |
| 2004/0192275 A1* | 9/2004 | Kim | 455/418 |
| 2006/0114350 A1* | 6/2006 | Shimada et al. | 348/423.1 |

FOREIGN PATENT DOCUMENTS

| | | |
|---|---|---|
| EP | 0863646 | 9/1998 |
| HU | 222 337 B1 | 2/2000 |
| WO | WO 00/65776 | * 11/2000 |
| WO | WO 0065776 | 11/2000 |
| WO | WO 01/22688 A1 | 3/2001 |

OTHER PUBLICATIONS

"System and Method for communication" by Kiraly et al. Internal Publication # WO 00/65776.*

* cited by examiner

Routing

Fig.3A

Data aggregate transfer process

DATA COMMUNICATIONS NETWORKS, SYSTEMS, METHODS AND APPARATUS

FIELD OF THE INVENTION

The present invention relates to improvements in data communications networks and to systems, methods and apparatus employed in such networks.

BACKGROUND TO THE INVENTION

In conventional client/server data networks, such as TCP/IP or other routed networks, a main server serves all terminals via a single server socket. This results in extreme spikes in the network load, especially when data is required to be transferred to a large number of clients simultaneously, causing delays in data transmission.

The present invention seeks to provide improved network systems, methods and apparatus whereby network performance is enhanced.

SUMMARY OF THE INVENTION

The invention provides improved data communications networks, methods of operating data communications networks, network servers, network terminals and computer programs as defined in the claims appended hereto.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
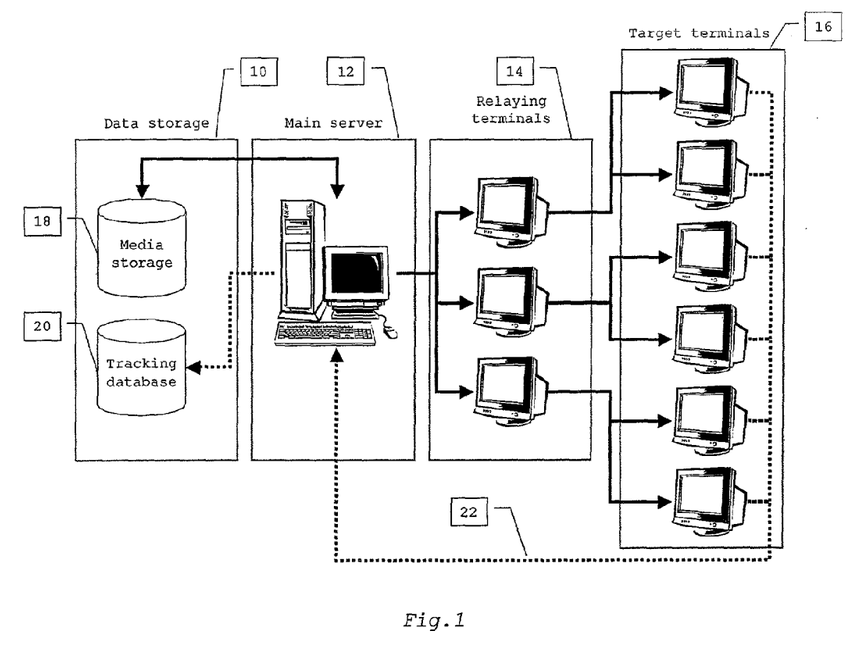
FIG. 1 is a diagram illustrating the operational model of a data communications network embodying the present invention.

Referring now to the drawings, FIG. 1 illustrates an operational model of a simplified exemplary embodiment of a data communications network in accordance with the invention. The network includes a data storage system 10, which in this embodiment includes media storage system 18 for data (i.e. "media" or "content") that is to be selectively distributed over the network, and a tracking database 20 that is used for managing the operation of the network as shall be described in more detail below. For convenience, data that is to be distributed from the media storage system 18 will be referred to herein as "content", which will be understood to include any type of data of interest to end users, including but not limited to text, graphics, video, audio, executable code etc. Content will generally comprise a data file of some type.

For the purposes of the present invention, "content" means files or parts of files or equivalents thereof that are stored on a server, downloaded from the server by a client and stored by the client for subsequent use, as distinct from digital broadcast media in which a data stream is transmitted by a broadcast server and is temporarily buffered by clients and, in some cases, by intervening relay units.

The network further includes a main server 12 that communicates with the media storage system 18 and tracking database 20, and controls the distribution of content from the media storage system 18. The network also includes a plurality of terminals 14 and 16, to which content is to be distributed. In accordance with the invention, when the same content is to be distributed to a number of terminals, at least some of the terminals 14 also act as "relay servers" in distributing the content to the remaining terminals 16 (i.e. some or all of the terminals may also be capable of acting as relay servers).

All transactions between the media storage system 18 and the terminals 14, 16 are controlled by the main server 12. In particular, all data downloads to the terminals from the media storage system 18 are managed by the main server 12. Generally, content is retrieved from the storage system by the main server and forwarded on to the terminals 14, 16 by the main server. In some cases, however, the main server does not itself retrieve and forward content, but manages the retrieval and forwarding of content by other servers.

The term "target terminal" used here means a terminal which is the intended recipient of content (a data file) from the media storage 18. Each terminal 14, 16 can be the target for a data file. In this embodiment, each of the first set of terminals 14 is also adapted to operate as a relay server by forwarding data to one or more of the second set of terminals 16 as described further below. The terminals 16 may also act as relay servers for relaying data to additional terminals (not shown) downstream thereof. It will be understood that not all of the terminals included in the network need operate as relay servers and the network may include terminal devices that are not suited for operation as relay servers.

The tracking database 20 keeps records of transactions between the main server 12 and the various terminals 14, 16. In particular, the tracking database monitors the performance (communication speed and/or other parameters such as reliability) of all terminals that also act as relay servers in the network. This information is available to the main server. In particular, the tracking database 12 is able to provide the main server with lists of terminal addresses ranked by their relative performances.

In operation of the network, when a content data file is to be distributed to particular target terminals, the main server 12 initiates a data transport operation by sending a transport request to the first set of terminals 14, which are selected as being the best terminals from the list of target terminals on the basis of the current performance data. The transport request includes:

Details of the file to be transported. These will generally include, for example, the file type and size, time stamps for activation and deactivation of the content, encryption and compression details, etc.

The addresses of relay servers and terminals that are to be involved in the distribution of the file.

The transport request sent from the main server 12 to the first set of terminals 14 instructs these terminals to retrieve the data from the main server 12 (or from another server address included in the transport request). The list of the remaining target terminal addresses is divided between the first terminals 14, so that each of the first terminals 14 acts as a relay server for distributing the data to a subset of the remaining target terminals.

In response to the transport request from the main server 12, each of the first terminals 14 begins to download the file from the main server 12. When one of the first terminals 14 has received a predetermined number of bytes of the file, that terminal 14 sends a modified version of the original transport request to its subset of the target terminals 16. The modified transport request identifies the relevant first terminal 14 as the server address from which its subset of the target terminals 16 should retrieve the data. Depending on the number of target terminals, the list of target terminals may be sub-divided a number of times. That is, each of the second set of terminals 16 may receive a list of further target terminals for which it is to act as a relay server. At each stage, it is preferred that the "best" terminals from the list of remaining targets are selected to act as relay servers for the remainder.

When each terminal 14 or 16 has downloaded the whole file, it sends a notification message direct to the main server 12, as indicated by 22 in FIG. 1.

The main server 12 is adapted to serve data requests from the first set of terminals 14. If the terminal in the second set of terminals 16 cannot reach the terminal in the first set of the terminals 14 it will send the data request to the main server 12.

Generally, the main server and each downstream terminal acting as a relay server will only serve a small number (e.g. 2 to 5) of downstream terminals. If the number of target terminals is less than or equal to this number, the target terminals may all retrieve the data direct from the main server, or the main server may request the best of the target terminals to act as the relay server for the other(s).

It will be understood that the network may include many more terminals than are illustrated in FIG. 1, arranged in a tree structure wherein each terminal is either a node (functioning as both a relay server and a target terminal) or a leaf (functioning only as a target terminal); i.e. there may be multiple node terminals in the downstream data transmission path between the main server and each target terminal. Preferably, there is also an upstream communication path 22 from each terminal 14, 16 direct to the main server 12. The upstream path 22 is used by target terminals to acknowledge receipt of data. These acknowledgements are sent directly from the target terminals to the main server 12 as illustrated. The upstream path 22 between the terminals 14 and the main server 12 has been omitted from FIG. 1 for clarity of illustration.

It should be understood that the operational model illustrated in FIG. 1 may be implemented using an existing, conventional network infrastructure (such as the Internet or equivalent) and does not require a new physical network. Servers and terminals may be connected to the network backbone by synchronous fixed connections such as ISDN, HSDL, T1 or T3 and the network may include dial-up connections, wireless connections etc. That is, FIG. 1 illustrates logical connections between the server and terminals, rather than physical connections. Further, the logical connections between the main server and terminals vary dynamically in use of the network, as shall be described further below.

The invention is particularly suited for use where all terminals are capable also of acting as relay servers as described and can be assumed to be permanently on-line. However, it will be understood that the invention may be adapted to accommodate terminals that do not also act as relay servers (such terminals would always be "leaves", at the end of lists of target terminals).

The target terminal requests each packet to be transferred separately. The packet to be transferred includes the information about the type of the data to be transferred, size, compression, and the checksums required for the validation of the transferred data packet.

Figure 2A:
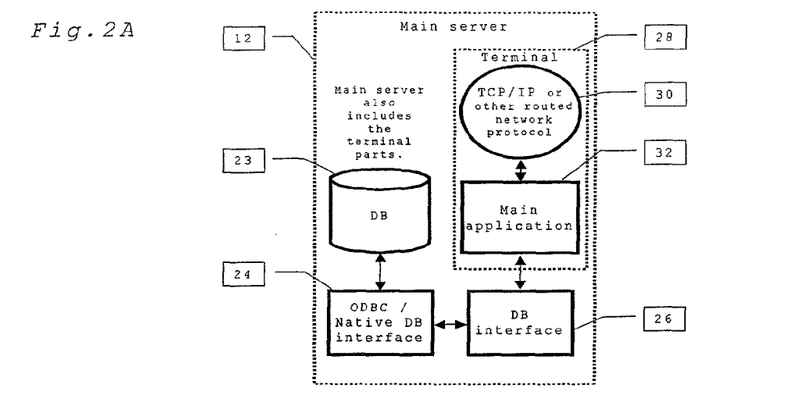
FIGS. 2A, 2B and 2C are diagrams illustrating the operational structure of a main server and terminals employed in the network of FIG. 1.
Figure 2B:
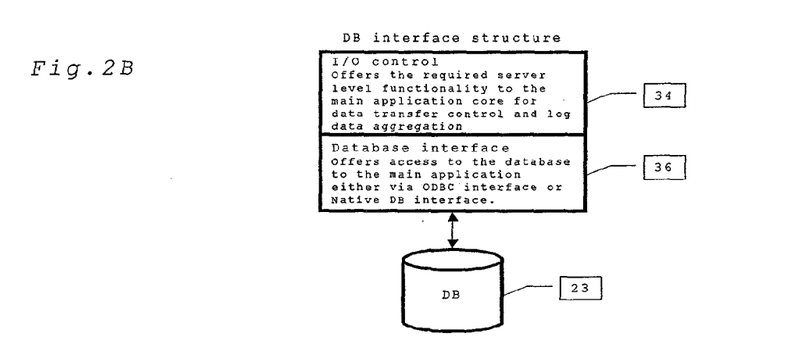

FIG. 2A of the drawings illustrates the operational structure of the main server 12, including a network database 23 for storing network information including the addresses etc. of network terminals (this database may implement all or part of the functionality of the tracking database 20 of FIG. 1; these database functions can be performed by one or more database systems on one or more computers/servers), database interface modules 24, 26, and a terminal module 28. The terminal module 28 included in the main server 12 is also used in each of the network terminals/relay servers 14 and 16, and includes a routed network protocol module 30 (preferably a TCP/IP module, but other routed protocols may be used) and a main application module 32. As shown in FIG. 2B, the database interface modules 24, 26 provide I/O (input/output) control functions 34, providing the required server level functionality to the core of the main application 32 for data transfer control and for logging data aggregation, and database interface functions providing access to the network database 23. For example, this may be either via an ODBC (open database connectivity) interface or a database interface native to the network database system 23.

Figure 2C:
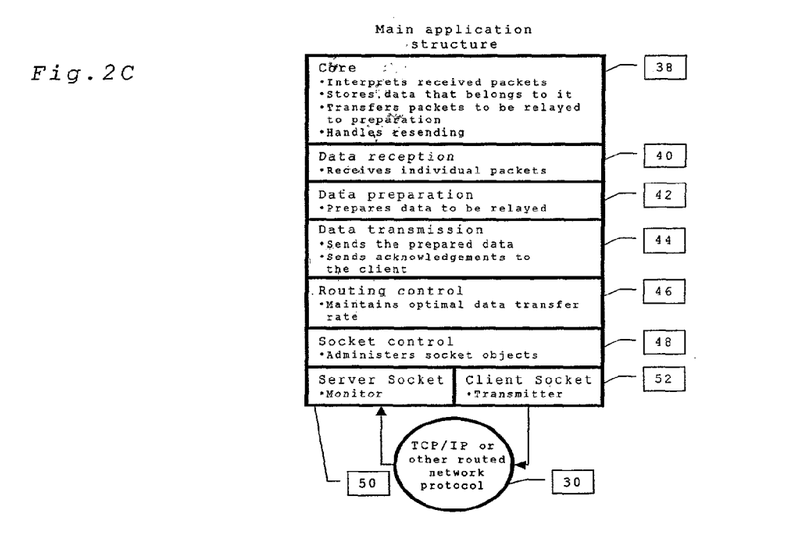

As shown in FIG. 2C, the main application 32, as employed in both the main server and those terminals that also act as relay servers, comprises the following functional modules:

A core module 38 interprets received packets and stores data.

A data reception module 40 receives individual packets.

A data preparation module 42 prepares data to be relayed.

A data transmission module 44 sends data prepared by the preparation module 42 and sends acknowledgements to relevant clients.

A routing control module 46 maintains optimal data transfer rates.

A socket control module 48 administers socket objects.

A server socket 50 monitors data received via the TCP/IP module (or other routed network protocol module) 30.

Client sockets 52 transmit data via the module 30. The number of client sockets varies dynamically depending on the number of server connections required at any particular time.

In a conventional system, a server has a server-oriented connection for clients, comprising a server socket which is used to connect to the client's server socket. In the present invention, the main application used in the main server 12 and in each terminal that also operates as a relay server contains a standard server socket 50 for receiving data from its clients. In addition to this, the main application also has client sockets 52 for downstream communications to the downstream terminals. The actual data to be transmitted to the target terminals is sent via these client sockets and acknowledgements are received from terminals via the server socket. When the required data has been sent by the server, the client socket created for the purpose of sending the data can be destroyed, so as not to consume network resources unnecessarily. By this method, received acknowledgements will not cause any interruptions in the outgoing data flow. Each terminal/server has two "hard-coded" sockets, one client socket 52 for serving other terminals/servers and one server socket 50 for main-server connection use only. Additional sockets can be created and used dynamically as required. Each socket has an independent processor thread controlling it so that sockets can be managed and controlled without interrupts and delays.

The opening and operation of sockets is handled dynamically using a C++ class-application which generates a new socket when it needs a new instance of this class. In this manner sockets can be managed dynamically and their number varied as necessary. Each thread owns and controls its own sockets. When a socket is no longer needed the controlling thread destroys the socket and then destroys itself.

The operation of the network will now be described.

Figure 3A:
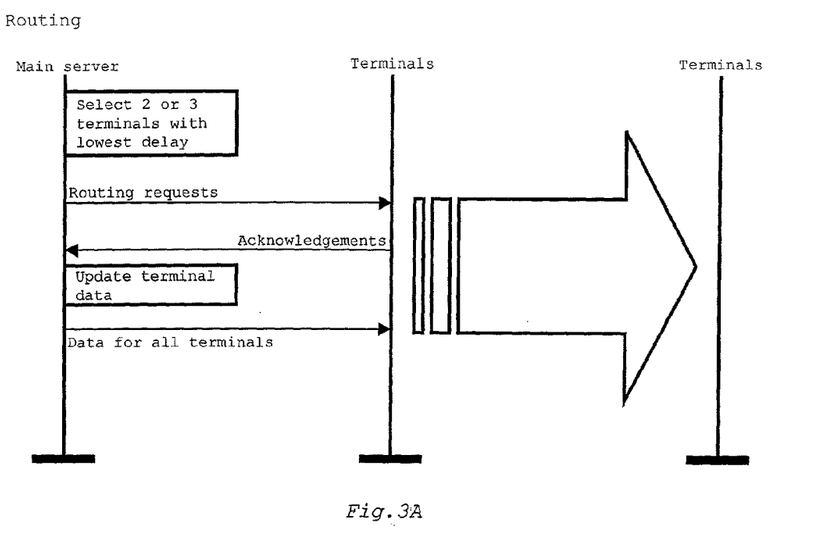
FIGS. 3A and 3B are transaction diagrams illustrating routing and data transfer processes employed in the network of FIG. 1.

FIG. 3A illustrates the routing process.

The main server selects a first set of a few (two or three) terminals, and sends the transport request (which includes the addresses of the relevant target terminals) to each of these. Each of this first set of terminals acknowledges its connection in the dynamic route by sending a message direct to the main server. The speed of this acknowledgement can be used to update the terminal data used for monitoring terminal performance. This first set of terminals is selected as being the "best" ("fastest") terminals for use in transferring data to the particular target terminal, based on performance data previously acquired in operation of the network and stored in the network database.

When the data transfer is underway, data is transferred to the known terminals already registered as part of the network. If a new terminal is registered to the main server during the transfer it will be included in the next data transfer.

As previously described, the main server selects the terminals with the shortest response times. This information is obtained in the following manner: the primary recipient of routing acknowledgements from particular terminals is the "server role" application that sent the transport request to those terminals. When the transfer chain is completed, information is naturally relayed automatically to the main server. The performance of different terminals (network addresses) is measured simply by measuring the response time between different terminals and by selecting the terminals with shortest response times.

It is not necessary for the terminals to know the entire network address space of the network, since the target terminal addresses are included in the transport requests.

As part of the transport request, the main server sends the addresses of other target terminals to the first set of terminals/ relay servers. Each terminal selects its own downstream terminals/relay servers and sends the rest of the target network addresses to these terminals/relay servers as part of the modified transport request. That is, each one of the first set of terminals selects a further two or three "best" terminals/relay servers from the addresses forwarded to it by the main server and passes the modified transport request on to these terminals, including the details of the other remaining target terminals. Because of this dynamic routing, the main server need not know explicitly which terminals deliver data and which terminals receive it. It is sufficient that it is ensured that each terminal in the route is accessible. If the delivery fails for one terminal for some reason, this is registered in the database and failed deliveries are repeated during the next transfer.

Once the route to a particular target has been established, the packets of the data file are passed along the defined route via the selected relay servers on the basis of the target terminal address in the handle/header of each packet.

Automatic routing evenly divides the load over a larger network region, reducing the time window required for any particular data transfer operation.

Figure 3B:
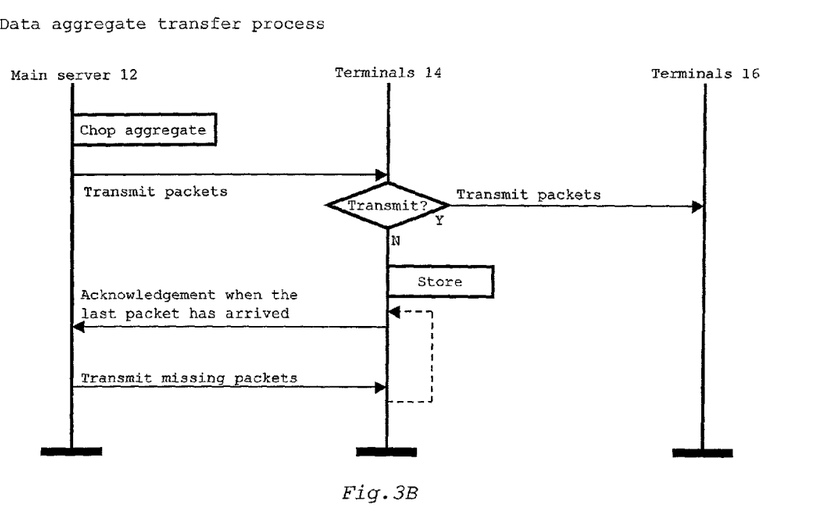

The data transfer process is illustrated in FIG. 3B.

As shown in FIG. 3B, in response to the transport request each target terminal requests the data from the main server or the upstream terminal acting as the server (as specified in the transport request) as packets, reassembles the file and, if necessary, relays the packets to downstream target terminals. When the target terminal has received the last packet of the file, it sends an acknowledgement to the main server.

It is preferred that all data is transferred in encrypted and compressed binary format. In this manner data security is improved as compared with transferring plain text and data transfer requires less time. Binary format data requires less "intelligence" from the relevant application as there is no need to interpret the received data. It can be restructured directly to form a suitable data structure. All received data is primarily restructured to the base type (identified in the packet header), after which the information included in the base type indicates the oriented data type. This mechanism also provides for data verification: the size of each data type is predetermined and the amount of received data must correspond to the size of the data type.

Since the data delivered is binary only, and the size of the packets is quite small and the number of the packets may be quite large, there is no risk that the purpose of the delivered data may be determined in the event that some of the packets are accessed by unauthorised parties on delivery. It is very difficult to deduce the content of binary data without knowing its structure. Accordingly, this improves data security when using a public network.

In order to provide a better understanding of the invention, examples of data transfers will be described with reference to a preferred embodiment of a network in accordance with the invention. As previously described, the main server includes or has access to a network database that lists all of the currently active/registered terminals/relay servers in the network, ranked in order of their performance (speed). Assume that data to be transferred from the main server to one or more target terminals comprises a single data file.

As previously described, the transport request includes the address(es) of the/each target terminal and other information about the data to be transferred, including the number of packets etc.

As a first example, assume that the data is to be transferred to a single target terminal. The main server sends the transportation request direct to the target terminal. The target terminal acknowledges the request and then requests the main server to send each packet in turn. Each of these packets is compressed and encrypted individually. The target terminal acknowledges each packet. If a particular packet fails, it is only necessary to re-transmit that packet, rather than to begin the entire download from the beginning. In some circumstances, data transfers to a single target terminal using the invention might not be significantly faster than conventional download methods. However, the compression applied to the packets and the fact that failed packets do not require the download to be re-started mean that single target downloads are generally quicker and more reliable than conventional methods, particularly for very large files.

Figure 4:
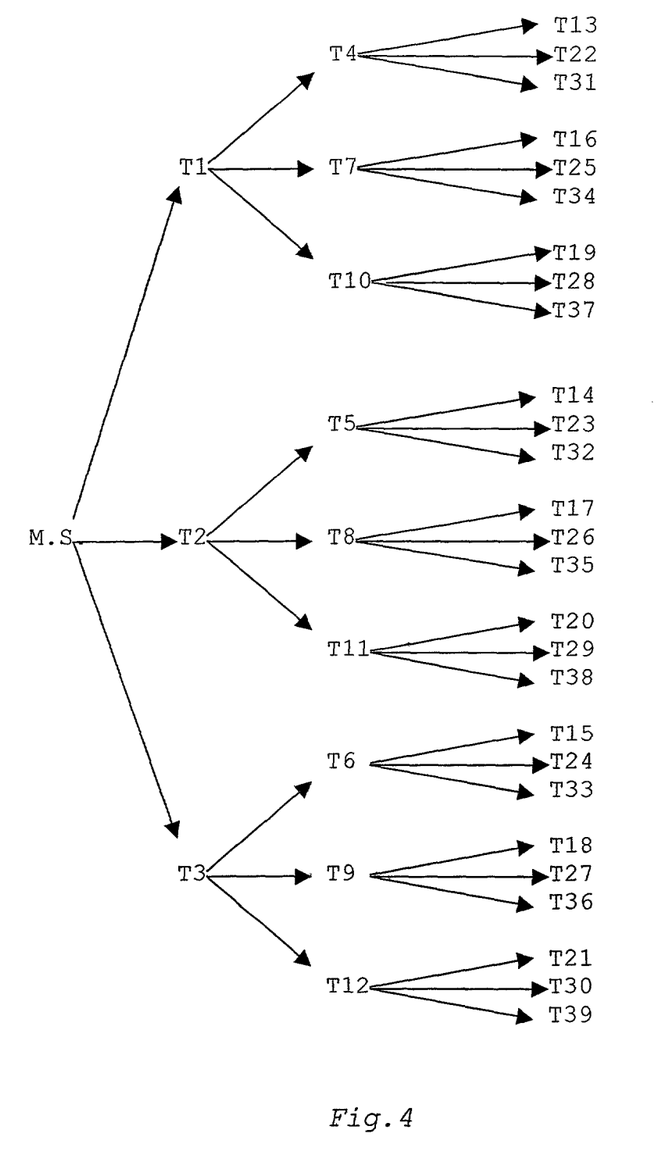
FIG. 4 is a diagram illustrating one example of a scheme for distributing data from a main server to a number of target terminals in accordance with the invention.

As a second example, referring to FIG. 4, assume that the data is to be transferred to thirty nine target terminals T1-T39, ranked in order of performance. Assume that the main server, M.S., and each terminal acting as a server will communicate directly downstream only with a predetermined number N of downstream terminals, and that N=3. The main server sends a first transport request to terminal T1, a second transport request to terminal T2, and a third transport request to terminal T3, each including one third of the complete list of target addresses. Since the terminal addresses are ranked in order of performance, in order to distribute the load evenly across the network the request sent to T1 comprises every 1+Nth address (T1, 4, 7, 10, 13, 16, 19, 22, 25, 28, 31, 34, 37), the request sent to T2 comprises every 2+Nth address (T2, 5, 8, 11, 14, 17, 20, 23, 26, 29, 32, 35, 38), and the request sent to T3 comprises every 3+Nth address (T3, 6, 9, 12, 15, 18, 21, 24, 27, 30, 33, 36, 39). It can be seen how this approach may be applied for any value of N and any number of terminals.

Referring to T1 and its associated downstream addresses, upon receipt of the request from the main server, T1 acknowledges the request and can immediately begin downloading packets from the main server. T1 also relays the modified request to the next set of N fastest terminals (T4, T7 and T10) of the list of target addresses sent to T1. The request relayed to each of T4, T7 and T10 includes 1/Nth (⅓) of the remaining addresses originally sent to T1, distributed in a similar manner to that in which the complete target list was originally distributed among T1, T2 and T3 (i.e. T4 receives the addresses for T13, T22 and T31; T7 receives the addresses for T16, T25 and T34; and T10 receives the addresses for T19, T28 and T37). Each of the terminals T4, T7 and T10 acknowledges the request to the main server, begins downloading packets from T1 (this process can begin before the download from the main server to T1 is complete), and forwards the further modified request to the remaining terminals in its own address list, each of which acknowledges the request to the main server and begins downloading packets from its respective relay terminal. In this example, these are the final "leaf" terminals, but it can be seen how this process could be extended to any number of terminals through any number of relay stages. It can also be seen how the same scheme applies to the target address lists for T2 and T3.

It will be understood that the precise distribution scheme could be varied from that illustrated in FIG. 4. The important point is that relatively faster terminals are used at the beginning of the routes and the relatively slowest terminals are at the ends of the routes.

If a transfer to a particular terminal fails, that terminal is moved down the target list, so that the next fastest terminal in the relevant subset of the distribution list is "promoted" in the tree structure. For example, in FIG. 4, if the connection from T2 to T8 fails, T8 would be swapped with T17. If the new connection also failed then other options would be tried. If all available options fail then this is reported back to the main server.

It will also be understood that the distribution scheme in accordance with the invention could be implemented using different network architectures. The network database need not be on the same server/computer as the distribution management system (that generates the transport requests), but must be accessible to it. The data to be transferred need not be resident on or accessible to the same server/computer as the distribution management system. The transport request sent to the first set of terminals (T1, T2, T3 in FIG. 4) could include a further address of another server (a "distribution server") from which the data is to be obtained. The distribution server may have substantially the same functionality as previously described for the main server and the relay servers.

The terminal downloading the data acknowledges the packets to the server from which it is downloading. When the download is complete it sends the acknowledgement to the main server.

The invention thus provides data communications systems, methods and apparatus with improved performance, in which some or all terminals also operate as relay servers, as necessary, dynamic routing and distributed data transfer ensures optimal or near-optimal data transfer rates to every terminal in the entire terminal network and dynamic routing ensures data delivery even if part of the network fails.

Improvements and modifications may be incorporated without departing from the scope of the invention as defined in the claims appended hereto.

The invention claimed is:
1. A data communication network comprising: a plurality of terminals; and
   a main server adapted to manage selective retrieval of data from a first server by at least one target terminal selected from said plurality of terminals, said main server being distinct from said first server; and
   a network information database containing terminal performance information, wherein
  at least two of said terminals are adapted to act as relay servers for serving data retrieved from said first server to at least one target terminal; and wherein
  the main server is adapted to send transport requests direct to at least one first target terminal on the basis of said terminal performance information, and wherein the main server is further adapted to monitor response times of terminals in the network and in which terminals are selected to act as relay servers for a particular data transfers on the basis of their relative response times, and the first target terminal is adapted to act as relay server; and
  wherein each such transport request includes details of data to be retrieved, the address of the first server from which the data is to be requested by the first target terminal, the addresses of at least one second target terminal to which the data from the first server to be relayed by the first target terminal and an indication of a relative performance of a further target terminal based on the terminal performance information stored in the network information database; and
  wherein terminals adapted to act as relay servers are adapted to modify transport requests received from the main server or from other relay servers and to transmit the modified transport request to selected target terminals from a set of target terminals identified in the transport request, wherein the modified transport request further includes addresses of further target terminals for which the recipient of the modified transport request is to act as relay server; and
  wherein data to be retrieved by said target terminals are divided into a series of packets for transmission to said target terminals and each of said terminals is adapted to communicate directly with said main server to acknowledge receipt of the last packet of a series routed thereto.

2. The network as claimed in claim 1, wherein the modified transport request identifies the terminal transmitting the modified transport request as the server from which the recipients of the modified transport request should request the data.

3. The network as claimed in claim 1, wherein terminals acting as relay servers are adapted to select further downstream target terminals to act as further relay servers on the basis of their relative performances of the further target terminals indicated in said transport request.

4. The network as claimed in claim 1, wherein the first server is a terminal adapted to act as relay server.

5. The network as claimed in claim 1, wherein each of said terminals is adapted to communicate directly with said main server in an upstream direction.

6. The network as claimed in claim 1, wherein data is routed to said terminals as routed network protocol traffic such as TCP/IP traffic.

7. The network as claimed in claim 1, wherein said main server and each of said terminals includes a server socket for direct upstream communications between said terminals and said main server and at least one dynamically controlled and managed client socket for downstream data transfers between the main server and said terminals or between terminals acting as relay servers and other downstream terminals.

8. The network as claimed in claim 1, wherein data is transmitted in binary format.

9. A method of operating a data communication network, the data communication network comprising: a plurality of terminals, a network information database and a main server adapted to manage selective retrieval of data from a first server by at least one target terminal selected from said plurality of terminals; comprising operating at least two of said terminals as relay servers for serving data retrieved from said first server to at least one target terminal, wherein said main server is distinct from said first server, and further comprising:

sending transport requests from the main server to at least one first target terminal based on terminal performance information stored in the network information database; and operating the first target terminal to act as relay server;

operating the main server to monitor the response times of terminals in the network and selecting terminals to act as relay servers for particular data transfer on the basis of their relative response times;

wherein each such transport request includes details of data to be retrieved, the address of the first server from which the data is to be requested by the first target terminal, addresses of at least one second target terminal to which the data retrieved from the first server is to be relayed by the first target terminal and an indication of a relative performance of a further target terminal based on the terminal performance information stored in the network information database;

operating terminals adapted to act as relay servers are adapted to modify transport requests received from the main server or from other relay servers and to transmit the modified transport request to selected target terminals from a set of target terminals identified in the transport request, wherein the modified transport request further includes addresses of further target terminals for which the recipient of the modified transport request is to act as relay server; and wherein dividing data to be retrieved by said target terminals into a series of packets for transmission to said target terminals and wherein each of said terminals communicates directly with said main server to acknowledge receipt of the last packet of a series routed thereto.

10. The method as claimed in claim 9, including the modified transport request identifying the terminal transmitting the modified transport request as the server from which the recipients of the modified transport request should request the data.

11. The method as claimed in claim 9, including operating terminals acting as relay servers to select further downstream target terminals to act as further relay servers on the basis of the relative performances of the further target terminals indicated in said transport request.

12. The method as claimed in claim 9, wherein the first server is a terminal adapted to act as relay server.

13. The method as claimed in claim 9, wherein each of said terminals communicates directly with said main server in an upstream direction.

14. The method as claimed in claim 9, including routing data to said terminals as routed network protocol traffic such as TCP/IP traffic.

15. The method as claimed in claim 9, including transmitting said data in binary format.

16. A network server adapted to operate as a main server in a data communication network, the data communication network including:

a plurality of terminals, a network information database and a first server which from which data be retrieved by at least one target terminal from among said plurality of terminals, at least two of said terminals being adapted to act as relay servers for serving data retrieved from said first server to at least one further target terminal based on terminal performance information stored in the network information database, said network server being distinct from said first server;

said network server being adapted to manage selective retrieval of data from said first server by at least one target terminal selected from said plurality of terminals; and wherein said network server being further adapted to monitor response times of terminals in the network and in which terminals are selected to act as relay servers for a particular data transfers on the basis of their relative response times, said network server being further adapted to send transport requests direct to at least one first target terminal that is adapted to act as a relay server, each such transport request includes details of data to be retrieved, the address of the first server from which the data is to be requested by the first target terminal, the addresses of at least one second target terminal to which the data retrieved from the first server is to be relayed by the first target terminal and an indication of a relative performance of a further target terminal based on the terminal performance information stored in the network information database;

wherein terminals adapted to act as relay servers are adapted to modify transport requests received from said network server or from other relay servers and to transmit the modified transport request to selected target terminals from a set of target terminals identified in the transport request, wherein the modified transport request further includes addresses of further target terminals for which the recipient of the modified transport request is to act as relay server; and wherein data to be retrieved by said target terminals are divided into a series of packets for transmission to said target terminals and each of said terminals are adapted to communicate directly with said main server to acknowledge receipt of the last packet of a series routed thereto.

17. A network terminal to operate as a relay server in a data communication network, the data communication network including:

a plurality of terminals, a network information database, a first server from which data may be retrieved by at least one target terminal from among said plurality of terminals; and a main server adapted to manage selective retrieval of data from the first server by at least one target terminal selected from said plurality of terminals based on terminal performance data stored in the network information database, and wherein the main server is further adapted to monitor response times of terminals in the network and in which terminals are selected to act as relay servers for a particular data transfers on the basis of their relative response times;

said network terminal being adapted to act as relay server for serving data retrieved from said first server to at least one target terminal by receiving and responding to transport requests sent to said network terminal, each such transport request including details of data to be retrieved, the address of the first server from which the data is to be requested by the network terminal, the addresses of at least one second target terminal to which the data retrieved from the first server is to be relayed by the network terminal and an indication of a relative performance of a further target terminal based on the terminal performance stored in the network information database;

wherein said network terminal adapted to act as relay server are further adapted to modify transport requests received from the main server or from other relay servers and to transmit the modified transport request to selected target terminals from a set of target terminals identified in the transport request, wherein the modified transport request further includes addresses of further target terminals for which the recipient of the modified transport request is to act as relay server; and wherein data to be retrieved by said target terminals are divided into a series of packets for transmission to said target terminals and each of said terminals are adapted to communicate directly with said main server to acknowledge receipt of the last packet of a series routed thereto.

18. The network terminal as claimed in 17, wherein the modified transport request identifies the terminal transmitting the modified transport request as the server from which the recipients of the modified transport request should request the data.

19. A computer program product for enabling a network server to operate as a main server in a data communication network, the data communication network including:
   a plurality of terminals, a network information database and a first server which from which data be retrieved by at least one target terminal from among said plurality of terminals, at least two of said terminals being adapted to act as relay servers for serving data retrieved from said first server to at least one further target terminal based on terminal performance information stored in the network information database, said main server being distinct from said first server, said computer program product comprising:
   a non-transitory computer usable medium having computer readable program code means embodied in said non-transitory medium, said computer readable program code means including:
   computer readable program code for causing said network server to manage selective retrieval of data from said first server by at least one target terminal selected from said plurality of terminals; and wherein said network server to monitor response times of terminals in the network and in which terminals are selected to act as relay servers for a particular data transfers on the basis of their relative response times,
   computer readable program code for causing said network server to send transport requests direct to at least one first target terminal that is adapted to act as a relay server, each such transport request including details of data to be retrieved, the address of the first server from which the data is to be requested by the first target terminal, the addresses of at least one second target terminal to which the data retrieved from the first server is to be relayed by the first target terminal and an indication of a relative performance of a further target terminal based on the terminal performance information stored in the network information database;
   a computer readable program code means for causing said network terminal to modify transport requests received from said network server or from other relay servers and to transmit the modified transport request to selected target terminals from a set of target terminals identified in the transport request, wherein the modified transport request further includes addresses of further target terminals for which the recipient of the modified transport request is to act as relay server; and
   wherein data to be retrieved by said target terminals are divided into a series of packets for transmission to said target terminals and each of said terminals are adapted to communicate directly with said main server to acknowledge receipt of the last packet of a series routed thereto.

20. A computer program product for enabling a network terminal to operate as a relay server in a data communication network, the data communication network including:
   a plurality of terminals, a network information database, a first server from which data may be retrieved by at least one target terminal from among said plurality of terminals; and
   a main server adapted to manage selective retrieval of data from the first server by at least one target terminal selected from said plurality of terminals based on terminal performance data stored in the network information database, and wherein the main server to monitor response times of terminals in the network and in which terminals are selected to act as relay servers for a particular data transfers on the basis of their relative response times; said computer program product comprising:
   a non-transitory computer usable medium having computer readable program code means embodied in said non-transitory medium, said computer readable program code means including:
   computer readable program code for causing said network terminal to act as relay server for serving data retrieved from said first server to at least one target terminal by receiving and responding to transport requests sent to said network terminal, each such transport request including details of data to be retrieved, the address of the first server from which the data is to be requested by the network terminal, the addresses of at least one second target terminal to which the data retrieved from the first server is to be relayed by the network terminal and an indication of a relative performance of a further target terminal based on the terminal performance stored in the network information database;
   said computer readable program code for causing said network terminal to modify transport requests received from the main server or from other relay servers and to transmit the modified transport request to selected target terminals from a set of target terminals identified in the transport request, wherein the modified transport request further includes addresses of further target terminals for which the recipient of the modified transport request is to act as relay server; and
   wherein data to be retrieved by said target terminals are divided into a series of packets for transmission to said target terminals and each of said terminals are adapted to communicate directly with said main server to acknowledge receipt of the last packet of a series routed thereto.

21. The computer program product as claimed in claim 20, said computer readable program code means further comprising computer readable program code whereby the modified transport request identifies the terminal transmitting the modified transport request as the server from which the recipients of the modified transport request should request the data.

* * * * *